US009924707B2

(12) United States Patent
Dambra

(10) Patent No.: US 9,924,707 B2
(45) Date of Patent: Mar. 27, 2018

(54) BIRD DETERRENT

(71) Applicant: Domenico Dambra, Pianoro (IT)

(72) Inventor: Domenico Dambra, Pianoro (IT)

( * ) Notice: Subject to any disclaimer, the term of this patent is extended or adjusted under 35 U.S.C. 154(b) by 0 days.

(21) Appl. No.: 15/500,489

(22) PCT Filed: Jul. 31, 2015

(86) PCT No.: PCT/IB2015/055814
§ 371 (c)(1),
(2) Date: Jan. 30, 2017

(87) PCT Pub. No.: WO2016/016858
PCT Pub. Date: Feb. 4, 2016

(65) Prior Publication Data

US 2017/0215406 A1 Aug. 3, 2017

(30) Foreign Application Priority Data

Aug. 1, 2014 (IT) ............................. MO2014A0231

(51) Int. Cl.
*A01M 29/00* (2011.01)
*A01M 29/32* (2011.01)
*E04D 13/00* (2006.01)

(52) U.S. Cl.
CPC ........... *A01M 29/32* (2013.01); *E04D 13/004* (2013.01)

(58) Field of Classification Search
CPC ....... A01K 45/00; A01M 29/00; A01M 29/32; A01M 29/06; E04H 17/00
USPC ............................................... 52/101; 256/12
See application file for complete search history.

(56) References Cited

U.S. PATENT DOCUMENTS 259,654 A * 6/1882 Worthington ......... E04H 17/003 256/12
321,171 A * 6/1885 Archibald ............... E04H 17/00 256/12
504,936 A * 9/1893 Niles ....................... E04H 17/00 256/12
511,700 A * 12/1893 Jacobs .................... E04H 17/00 256/12
3,294,893 A * 12/1966 Shaffer ................. A01M 29/26 174/117 R (Continued)

FOREIGN PATENT DOCUMENTS

CA 2268200 A1 10/2000
DE 20104722 U1 6/2001

(Continued)

OTHER PUBLICATIONS

International Search Report and Written Opinion dated Dec. 4, 2015 from International Patent Application No. PCT/IB2015/055814 filed Jul. 31, 2015.

*Primary Examiner* — Beth A Stephan
(74) *Attorney, Agent, or Firm* — Sunstone IP

(57) ABSTRACT

The bird deterrent comprises a substantially flat tilting surface, having a substantially elongated shape and a substantially curvilinear profile, which can be positioned in a balancing position and oscillating, as a consequence of a bird or the like perching on it, around at least an axis of rotation substantially horizontal and parallel to the longitudinal axis of the tilting surface, and support means associable with a perching surface and supporting the tilting surface.

16 Claims, 3 Drawing Sheets

(56) References Cited

U.S. PATENT DOCUMENTS

| | | | | | |
|---|---|---|---|---|---|
| 4,185,581 | A * | 1/1980 | Tilton | E04B 1/72 116/22 A |
| 5,293,721 | A * | 3/1994 | Richard | A01K 39/0113 114/221 R |
| 5,497,585 | A * | 3/1996 | Engler | A01M 29/32 52/101 |
| 6,367,419 | B1 * | 4/2002 | Gosselin | A01K 15/02 119/57.8 |
| 6,585,233 | B1 * | 7/2003 | Sorben | A01K 3/00 256/1 |
| 8,162,292 | B2 * | 4/2012 | Farmer | A01K 3/00 160/242 |
| 9,497,959 | B1 * | 11/2016 | Peters | A01M 29/06 |
| 2002/0064420 | A1 * | 5/2002 | Lin | B25B 7/02 403/217 |

FOREIGN PATENT DOCUMENTS

| | | | | |
|---|---|---|---|---|
| JP | 2005168409 | A | 6/2005 | |
| WO | WO 2016016858 | A1 * | 2/2016 | A01M 29/32 |

* cited by examiner

BIRD DETERRENT

TECHNICAL FIELD

The present invention relates to a bird deterrent.

BACKGROUND ART

It is widely known the health, environmental and aesthetic problem caused by defecation of birds in the cities.

Mechanical deterrents are being used to date comprising different embodiments, including "hedgehog" or spring steel structures which can be positioned on the external surfaces of houses, schools, hospitals and artworks.

Moreover, electrical deterrents are known powered by a control unit and operating by releasing low voltage micro-shocks able to keep the birds away from the pre-established area.

These deterrents of known type do have however some drawbacks.

In fact, the mechanical deterrents are in many cases used by the birds as a support for nesting, thereby greatly boosting the hygienic and aesthetic problem.

Furthermore, the repeated exposure to the atmospheric agents and defecation of the birds themselves leads to a rapid wear of the deterrent, thus causing high replacement costs.

In addition to this is the fact that the electrical deterrents imply high costs of manufacture, installation and maintenance.

DESCRIPTION OF THE INVENTION

The main aim of the present invention is to provide a bird deterrent which allows to effectively fix the health, environmental and aesthetic problem caused by the presence of a high number of birds in the cities.

Another object of the present invention is to provide a deterrent which allows to maintain a high level of hygiene over time and which is highly resistant to atmospheric agents and defecation of birds thus eliminating the costs of maintenance and/or replacement of the deterrent itself.

A further object of the present invention is to provide a bird deterrent which allows to overcome the mentioned drawbacks of the prior art within the ambit of a simple, rational, easy, effective to use and affordable solution.

The objects stated above are achieved by the present bird deterrent having the characteristics of claim 1.

BRIEF DESCRIPTION OF THE DRAWINGS

Other characteristics and advantages of the present invention will become better evident from the description of a preferred but not exclusive embodiment of a bird deterrent, illustrated by way of an indicative, but non-limiting example in the accompanying drawings in which.

EMBODIMENTS OF THE INVENTION

With particular reference to such figures, reference number 1 globally designates a bird deterrent.

According to the invention, the deterrent 1 comprises a substantially flat tilting surface 2, having a substantially elongated shape and a substantially curvilinear profile.

The tilting surface 2 can be positioned in a balancing position and is oscillating, as a consequence of a bird or the like perching on it, around an axis of rotation 3 substantially horizontal and parallel to the longitudinal axis of the tilting surface 2.

It is useful to point out that by "curvilinear profile" is meant the slightly rounded shape of the tilting surface 2.

In addition, by the expression "substantially flat tilting surface 2" is meant the regular and even pattern, i.e. without irregularities and gradients, of the tilting surface 2.

Figure 1:
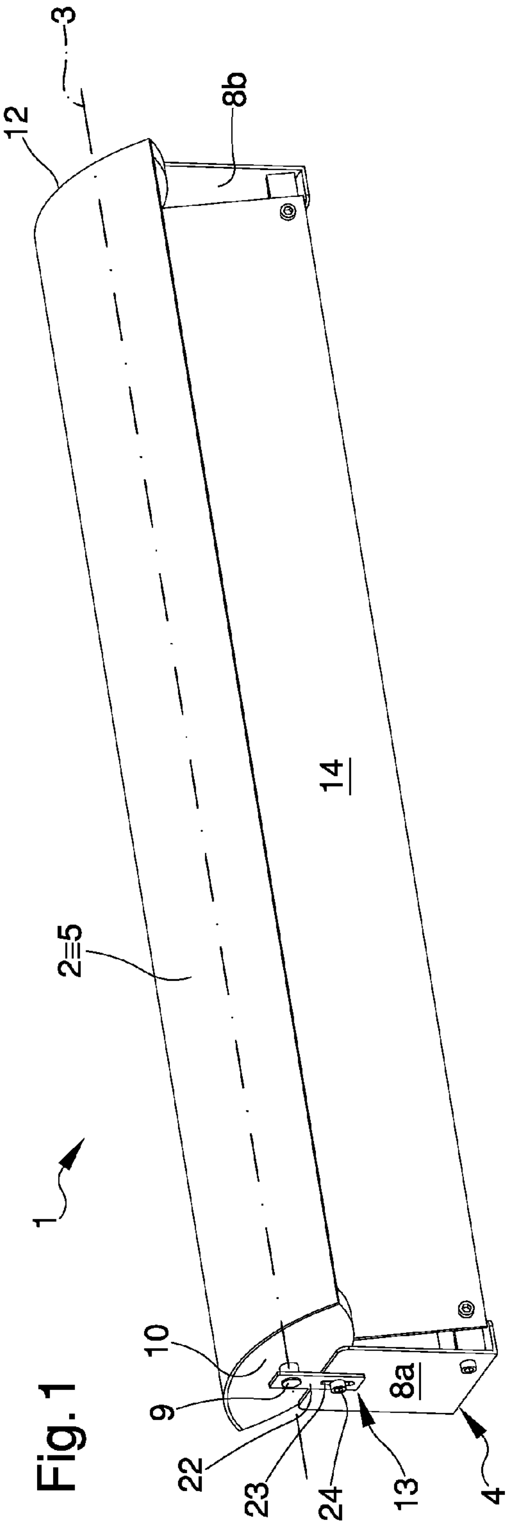
FIG. 1 is an axonometric view of the bird deterrent according to the invention in a first embodiment.
Figure 2:
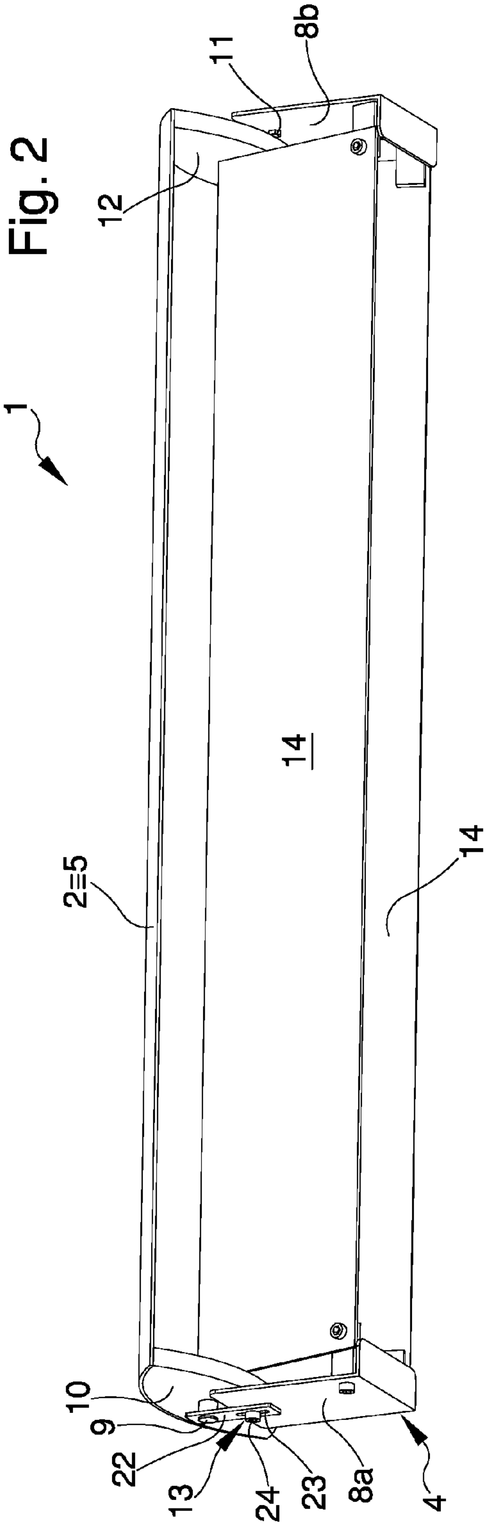
FIG. 2 is an axonometric front view and from below of the bird deterrent according to the invention in a first embodiment.

In a first embodiment shown in FIGS. 1 and 2, the tilting surface 2 is defined by a single body 5 having a substantially curvilinear profile.

Figure 3:
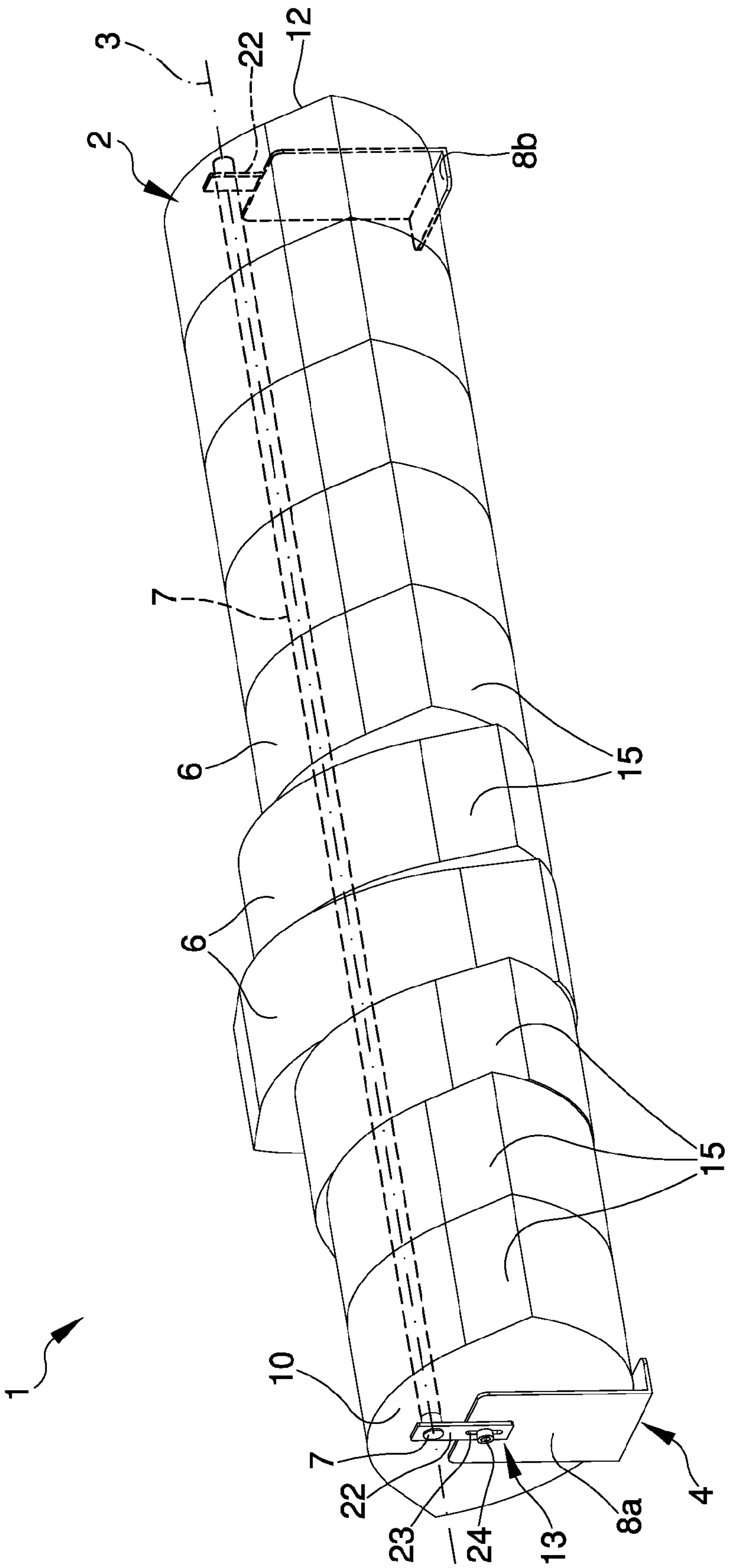
FIG. 3 is an axonometric view of the bird deterrent according to the invention in a second embodiment.

In a second embodiment, shown in FIG. 3, the tilting surface 2 comprises a plurality of oscillating slats 6 and coaxial to the longitudinal axis.

Each slat 6 is associated rotatable in correspondence of its median portion with a support shaft 7 coinciding with the axis of rotation 3.

In a balancing configuration, the tilting surface 2 is substantially horizontal.

As part of this discussion by "balancing configuration" is meant the non-application of external forces on the tilting surface 2.

Alternative embodiments cannot be ruled out wherein the tilting surface 2, in a balancing configuration, is substantially inclined, i.e. it is arranged neither horizontally nor vertically.

Preferably, the tilting surface 2 is inclined with respect to the longitudinal axis by an angle of between 15° and 45°.

In a preferred embodiment, the tilting surface 2 is inclined with respect to the longitudinal axis by an angle substantially equal to 20°.

The tilting surface 2 is made at least in part of a polymeric material.

Alternative embodiments cannot however be ruled out wherein the tilting surface 2 is made of metal or wood.

The support means 4 comprise at least one bracket 8*a*, 8*b* which can be fixed to the support surface.

With reference to the particular embodiment shown in the figures, the support means 4 comprise a first bracket 8*a* having a first pin element 9 associated with a first extremity 10 of the tilting surface 2 and a second bracket 8*b* having a second pin element 11 associated with a second extremity 12 of the tilting surface 2.

The first bracket 8*a* and the second bracket 8*b* are substantially parallel and positioned at the extremities 10, 12 opposite the longitudinal axis.

In other words, the first bracket 8*a* and the second bracket 8*b* are positioned in correspondence of the first extremity 10 and of the second extremity 12 respectively, of the tilting surface 2.

The first pin element 9 and the second pin element 11 are able to allow the oscillation, as a consequence of the application of external forces, of the tilting surface 2.

Alternative embodiments of the support means 4 cannot however be ruled out, wherein the first pin element 9 and the second pin element 11 are e.g. directly associated with side walls and parallel to the first extremity 10 and to the second extremity 12 of the tilting surface 2.

In addition, the support means 4 comprise at least a holding element 16 of at least one of the first bracket 8*a* and the second bracket 8*b* and associable with the perching surface.

The support means 4 are associable with the perching surface, not shown in the figures, by means of a layer of adhesive material or, alternatively, by means of screws and bolts.

The holding element 16 comprises joining means 17, 18 to a holding element 16 of another deterrent 1.

In an alternative embodiment, the support means 4 comprise a plurality of holding elements 16 associable with each other by interposition of the joining means 17, 18.

In detail, with each holding element 16 is associated at least one of the first bracket 8*a* and the second bracket 8*b*.

Figures 4, 5:
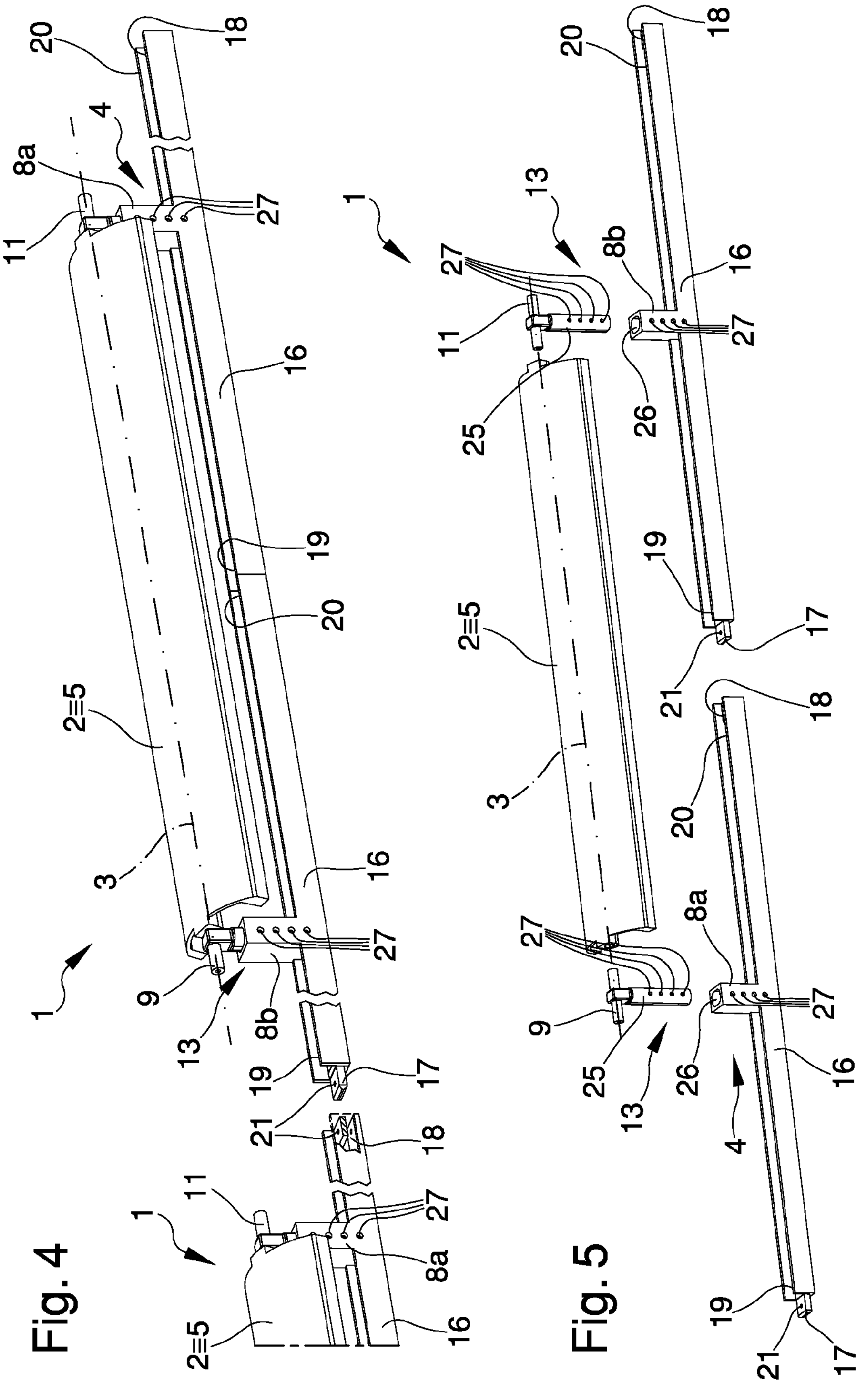
FIG. 4 is an axonometric view of the bird deterrent according to the invention in a third embodiment.
FIG. 5 is an exploded view of the deterrent of FIG. 4.

With reference to a possible third embodiment of the deterrent 1, shown in FIGS. 4 and 5, the support means 4 comprise two holding elements 16 each of which is associated with a bracket 8*a*, 8*b*.

In detail, the holding elements 16 and the brackets 8*a*, 8*b* are made, by molding, in a single body.

Alternative embodiments cannot however be ruled out wherein each bracket 8*a*, 8*b* is associated by interposition of screws, bolts or glue with each holding element 16.

The joining means 17, 18 comprise a projection 17 formed at one extremity 19 of each holding element 16 and a coupling seat 18 formed on the other extremity 20 of each holding element 16; in detail, the holding elements 16 are associable with each other by insertion of the projection 17 in the coupling seat 18.

The projection 17 and the coupling seat 18 comprise a housing hole 21 of a connecting element, the type of a screw, not shown in the figures, for the union of the holding elements 16.

The housing hole 21 of the projection 17 can be positioned substantially mating with the respective housing hole 21 of the coupling seat 18.

As can be visible in FIG. 4, the joining means 17, 18 allow to vary the width of the perching surface covered by deterrents 1, by the simple association of the projection 17 with the coupling seat 18.

It is easy to understand how this solution significantly increases the functional value of the present invention since, besides determining a significant reduction in the assembly/disassembly operating times of the deterrent 1, it allows to functionalize the tilting surface 2 according to consumers' needs.

The support means 4 comprise height adjustment means 13 for adjusting the height of the tilting surface 2.

With reference to FIGS. 1, 2 and 3 the height adjustment means 13 comprise a plate-shaped element 22 having a groove 23 wherein a pin element 24 is insertable so as to lock the tilting surface 2 at the desired height.

In an alternative embodiment, shown in FIGS. 4 and 5, the height adjustment means 13 comprise a coupling element 25 which extends below each pin element 9, 11 and is able to be fitted to measure in a housing seat 26 formed at the upper extremity of each bracket 8*a*, 8*b*.

In the present case, the outer surface of the coupling element 25 and of the housing seat 26 has a plurality of holes 27 wherein a locking element, not shown in the figures, is insertable to measure and able to lock the tilting surface 2 at a desired height.

Advantageously, the holes 27 are vertically aligned and also the holes 27 formed on the outer surface of the coupling element 25 mate with the respective holes 27 formed on the outer surface of the housing seat 26.

The deterrent 1 comprises at least a protection element 14 arranged below the tilting surface 2 and able to prevent the birds from perching below the tilting surface 2.

The protection element 14 is substantially plate-shaped.

Conveniently, the protection element 14 is substantially vertical and associated with the support means 4.

Advantageously, the protection element 14 is substantially inclined and contiguous to the tilting surface 2.

In the first embodiment, shown in FIGS. 1 and 2, the deterrent 1 has two substantially plate-shaped protection elements 14 arranged below the tilting surface 2.

In the second embodiment, shown in FIG. 3, the protection element 14 is made up of at least an extension 15 of the tilting surface 2.

Advantageously, the extension 15 is substantially curvilinear.

The extension 15 has a radius of curvature such as to prevent, during the oscillation, the birds from perching on the lower surface.

Further embodiments cannot however be ruled out wherein the protection element 14 consists of a grate, a bar or the like.

The operation of the present invention is as follows.

Once the deterrent 1 has been mounted on the surface to be protected, in the absence of external forces, the tilting surface 2 remains in a substantially horizontal position.

The bird, by gliding and perching onto the tilting surface 2, causes its oscillation and its switch from a substantially horizontal position to an inclined position.

In this way, the bird is in contact with an unstable surface which forces it to move away from the tilting surface 2 itself without, however, causing any physical damage to it.

Moreover, the protection element 14 allows to protect the lower surface, thus eliminating the possibility of perching by the birds themselves.

It has in practice been found how the described invention achieves the intended objects.

In particular the fact is underlined that the present invention allows to effectively satisfy the health, environmental and aesthetic problem caused by the presence of a high number of birds in the cities and to keep a high level of hygiene over time.

Furthermore, the present invention has a high resistance to atmospheric agents and defecation of birds thus eliminating the costs of maintenance and/or replacement of the deterrent itself and allowing at the same time to protect and maintain home gutters clean from leaves.

The invention claimed is:

1. A bird deterrent comprising:

at least a substantially flat tilting surface, having a substantially elongated shape and a substantially curvilinear profile defining a longitudinal axis of the substantially flat tilting surface, the substantially flat tilting surface being positioned in a balancing position and oscillating, in response to a bird perching on it, around at least an axis of rotation substantially horizontal and parallel to the longitudinal axis of said tilting surface, wherein the substantially flat tilting surface is substantially above the axis of rotation and the longitudinal axis remains above the axis of rotation during oscillation; and support means associable with a perching surface and supporting said tilting surface.

2. The deterrent according to claim 1, wherein said tilting surface, in a balancing configuration, is substantially horizontal.

3. The deterrent according to claim 1, wherein said tilting surface in a balancing configuration, is substantially inclined.

4. The deterrent according to claim 1, wherein said support means comprise at least a bracket which can be fixed to said perching surface.

5. The deterrent according to claim 1, wherein said support means comprise a first bracket having at least a first pin element associated with a first extremity of said tilting surface and a second bracket having at least a second pin element associated with a second extremity of said tilting surface, said first pin element and said second pin element being able to allow the oscillation, as a consequence of the application of external forces, of said tilting surface.

6. The deterrent according to claim 5, wherein said support means comprise at least a holding element of at least one of said first bracket and said second bracket associable with said perching surface.

7. The deterrent according to claim 6, wherein said holding element comprises a joining element configured to couple to at least a holding element of another deterrent.

8. The deterrent according to claim 7, wherein said support means comprise a plurality of said holding elements associable with each other by interposition of the joining element and with which is associated at least one of said first bracket and said second bracket.

9. The deterrent according to claim 8, wherein said joining element comprises a projection formed at one extremity of each of said holding elements and a coupling seat formed on the other extremity of each of said holding elements, said holding elements being associable with each other by insertion of said projection in said coupling seat.

10. The deterrent according to claim 9, wherein said projection and said coupling seat comprise at least a housing hole of a connecting element for the union of said holding elements, the housing hole of said projection being substantially matable with the housing hole of said coupling seat.

11. The deterrent according to claim 1, wherein said tilting surface is defined by a single body.

12. The deterrent according to claim 1, wherein said tilting surface comprises a plurality of oscillating slats and coaxial with respect to said axis of rotation.

13. The deterrent according to claim 1, wherein said support means comprise height adjustment means for adjusting the height of said tilting surface.

14. The deterrent according to claim 1, further comprising at least a protection element arranged below said tilting surface and configured to prevent said birds from perching below said tilting surface.

15. The deterrent according to claim 14, wherein said protection element is substantially plate-shaped and substantially vertical and is associated with said support means.

16. The deterrent according to claim 14, wherein said protection element is made up of at least an extension of said tilting surface.

* * * * *